United States Patent
Haque et al.

(10) Patent No.: US 7,804,903 B2
(45) Date of Patent: *Sep. 28, 2010

(54) HARDWARE-BASED CABAC DECODER

(75) Inventors: Munsi A. Haque, San Jose, CA (US); Musa Jahanghir, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1493 days.

This patent is subject to a terminal disclaimer.

(21) Appl. No.: 11/168,617

(22) Filed: Jun. 27, 2005

(65) Prior Publication Data

US 2006/0294174 A1 Dec. 28, 2006

(51) Int. Cl.
H04N 7/12 (2006.01)
G06K 9/36 (2006.01)

(52) U.S. Cl. .................. 375/240.25; 382/239

(58) Field of Classification Search .......... 348/416, 348/699, 402, 413; 382/107, 239; 341/107, 341/50, 51, 106; 375/240.16, 240.01, 240.12, 375/240.13, 240.17, 240.19, 240.2, 240.25

See application file for complete search history.

(56) References Cited

U.S. PATENT DOCUMENTS

| | | | |
|---|---|---|---|
| 5,602,593 A * | 2/1997 | Katto | 375/240.16 |
| 7,262,722 B1 * | 8/2007 | Jahanghir et al. | 341/107 |
| 7,365,660 B2 * | 4/2008 | Park et al. | 341/107 |
| 7,486,734 B2 * | 2/2009 | Machida | 375/240.25 |
| 2004/0268329 A1 * | 12/2004 | Prakasam | 717/141 |
| 2005/0052295 A1 * | 3/2005 | Bossen | 341/107 |
| 2005/0249289 A1 * | 11/2005 | Yagasaki et al. | 375/240.18 |
| 2006/0126744 A1 * | 6/2006 | Peng et al. | 375/240.26 |
| 2006/0209965 A1 * | 9/2006 | Tseng | 375/240.25 |
| 2009/0262825 A1 * | 10/2009 | Chujoh et al. | 375/240.16 |

OTHER PUBLICATIONS

Marpe, Detlev et al., "Context-Based Adaptive Binary Arithmetic Coding in the H.264/AVC Video Compression Standard", IEEE Transactions on Circuits and Systems for Video Technology, vol. 13, No. 7, Jul. 2003. pp. 620-636.

* cited by examiner

*Primary Examiner*—Behrooz Senfi
(74) *Attorney, Agent, or Firm*—Buckley, Maschoff & Talwalkar LLC

(57) ABSTRACT

A method of decoding a stream of compression-encoded image data. The method includes supplying at least two values to an adder. At least one of the values is determined based at least in part on a type of a current syntax element in the stream of compression-encoded image data. The method also includes adding the at least two values at the adder to produce an index value. The method further includes using the index value to access a look-up table.

18 Claims, 7 Drawing Sheets

HARDWARE-BASED CABAC DECODER

BACKGROUND

The H.264 video data compression-coding standard is well known and represents a new generation of video compression-coding that is expected to supersede the widely used MPEG-2 standard for many applications. H.264 achieves higher compression ratios than MPEG-2 but at the cost of greater processing complexity. In some aspects H.264 is similar to MPEG-2; for example, both utilize motion compensation to match current pixel blocks with reference pixel blocks to minimize the differential data that is to be transform-encoded.

One compression encoding option offered under H.264 calls for use of CABAC (context-based adaptive binary arithmetic coding) of syntax elements produced by transform-encoding (including motion vector information and other side data). CABAC potentially offers substantial additional compression efficiency relative to other types of later-stage encoding, but requires considerable processing complexity, particularly in regard to decoding. CABAC decoders for H.264 have been written in software for execution on general purpose processors, but the resulting decoder performance has been less than satisfactory in terms of throughput, especially for decoding a high resolution signal.

DETAILED DESCRIPTION

Figure 1:
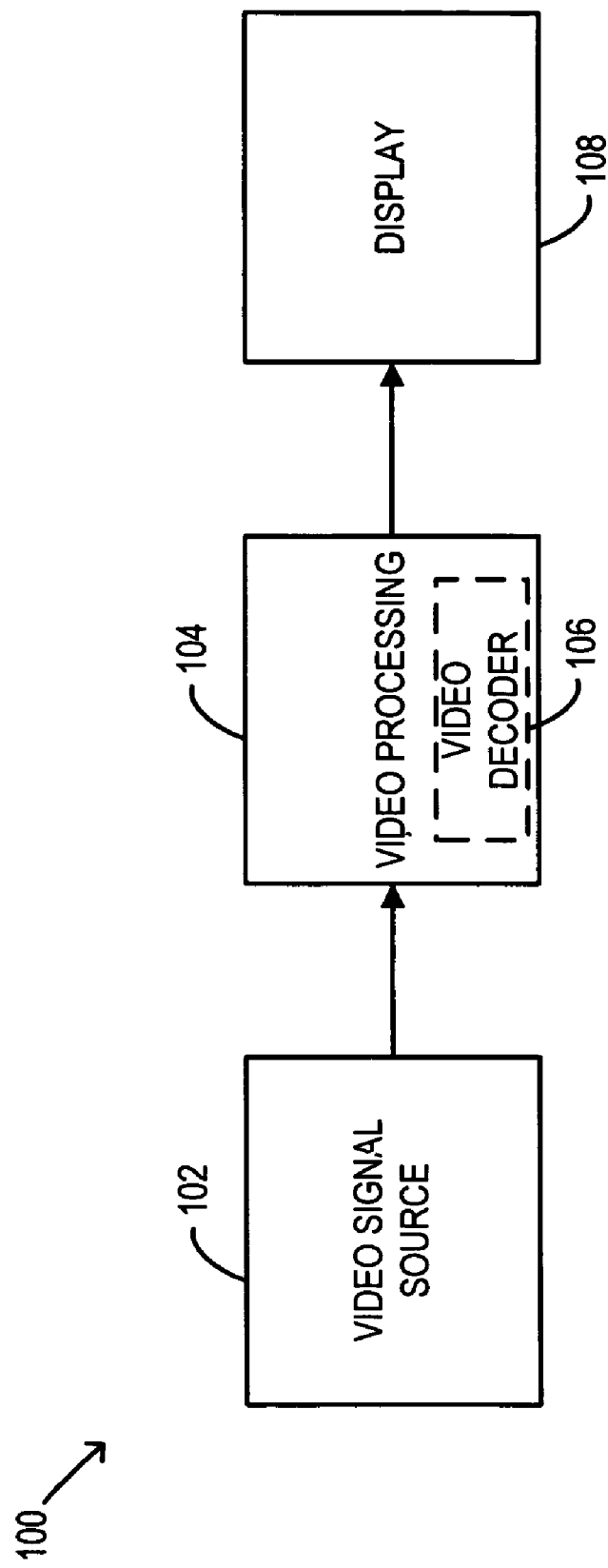
FIG. 1 is a block diagram showing components of a video signal reproduction system according to some embodiments.

FIG. 1 is a block diagram showing components of a video signal reproduction system 100 according to some embodiments.

The system 100 includes a video signal source 102. The video signal source 102 may be, for example, a receiving circuit which receives a compression-encoded video signal from, e.g., an over-the-air broadcast or from a cable television transmission. In addition or alternatively, the video signal source 102 may reproduce the video signal from a recording or storage medium such as a hard drive or a disk- or tape-shaped removable recording medium. The video signal may have been compression-encoded in accordance with the well-known H.264 standard, and CABAC (context-based adaptive binary arithmetic coding) may have been used as part of the compression encoding process that produced the compression-encoded video signal.

The system 100 also includes a video signal processing block 104 that is coupled to the video signal source 102. The video signal processing block 104 applies various processes to the compression-encoded video signal provided by the video signal source 102 to allow the video signal to be displayed. A major component of the video signal processing block 104 is a decoder block 106 (shown in phantom) which reverses the compression-encoding that was applied to the video signal. Aspects of the video decoder 106 will be the primary subjects of this disclosure. The video signal decoder 106 is suitable for decoding an H.264/CABAC-encoded video signal, and may have other capabilities as well.

Still further, the system 100 includes a display component 108 (e.g., a CRT or a flat panel display) to display the video signal after it has been decoded and possibly subjected to other processing by the video signal processing block 104.

Figure 2:
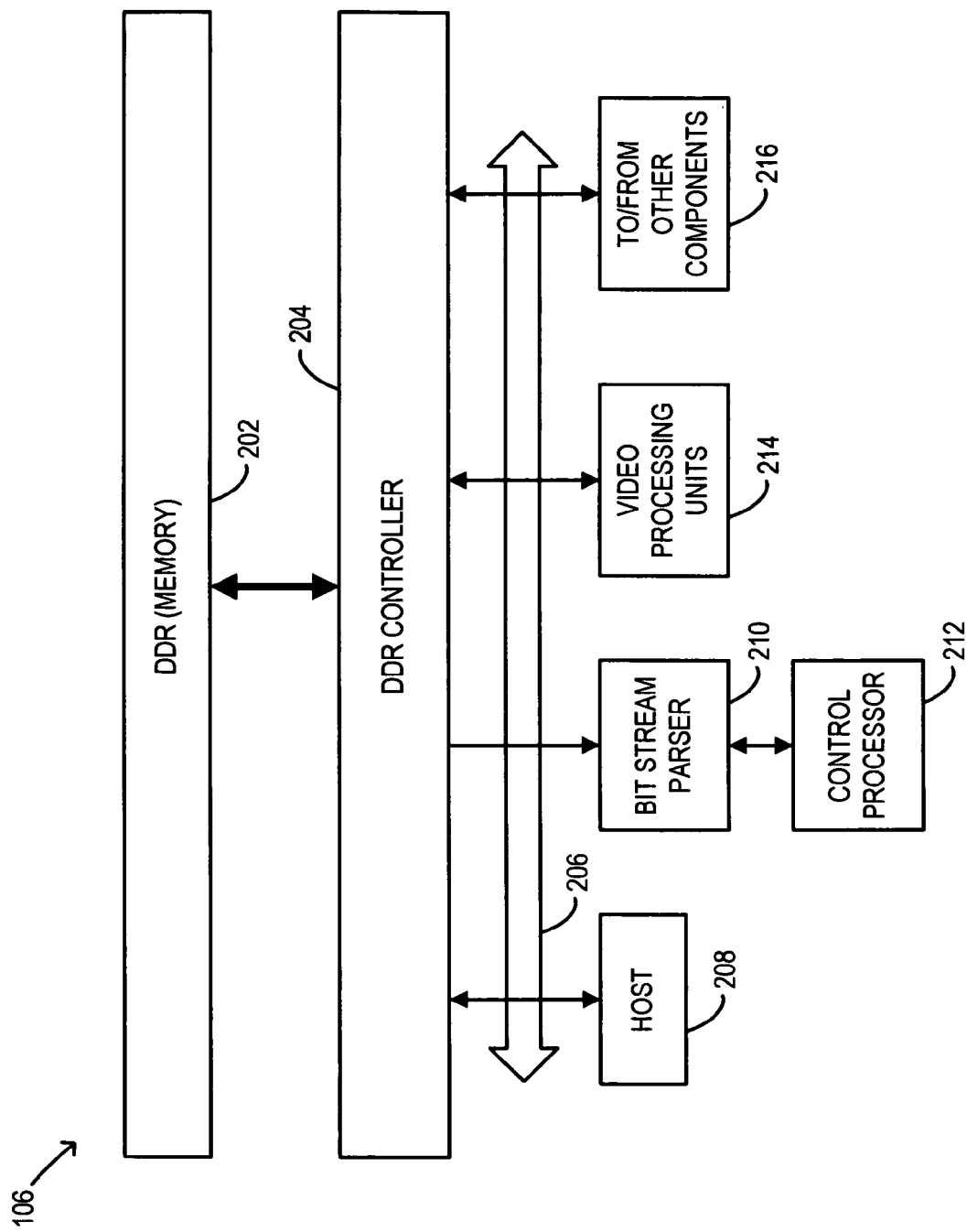
FIG. 2 is a block diagram which illustrates data flows in a video decoder block that is part of the system of FIG. 1.

FIG. 2 is a block diagram which illustrates data flows in the video decoder 106.

The video decoder 106 includes one or more memory devices, which are indicated at 202 and which may be dual data rate (DDR) memory devices. The DDR memory 202 may store both compression-encoded video signals as well as video signals in a condition after decoding.

The video decoder 106 further includes a memory controller 204 which is coupled to the memory 202. The memory controller 204 controls storage of video data in, and retrieval of video data from, the memory 202. The video decoder 106 may also include a bus 206. The bus 206 may, for example, operate in accordance with the well-known MBUS standard, and may allow data communication among the memory controller 204 and other components of the video decoder 106. Such other components may include a host processor 208, a bitstream parser (BSP) 210, a control processor 212 which is coupled to and manages the bitstream parser 210, other video signal processing units 214 and still other components which are represented by a block 216.

More the most part, the balance of this disclosure is concerned with certain aspects of the bitstream parser 210. As will be seen, the bitstream parser 210 is operative to receive and process a CABAC-encoded bitstream by expanding the incoming bits to a stream of bins and then translating the stream of bins into a sequence of H.264 syntax elements. The video processing units 214 reconstitute the video signal into reproducible form (e.g., by reconstructing macroblocks of the video signal) based on the residual transform data, motion vectors and other information represented by the syntax elements output from the bitstream parser.

Figure 3:
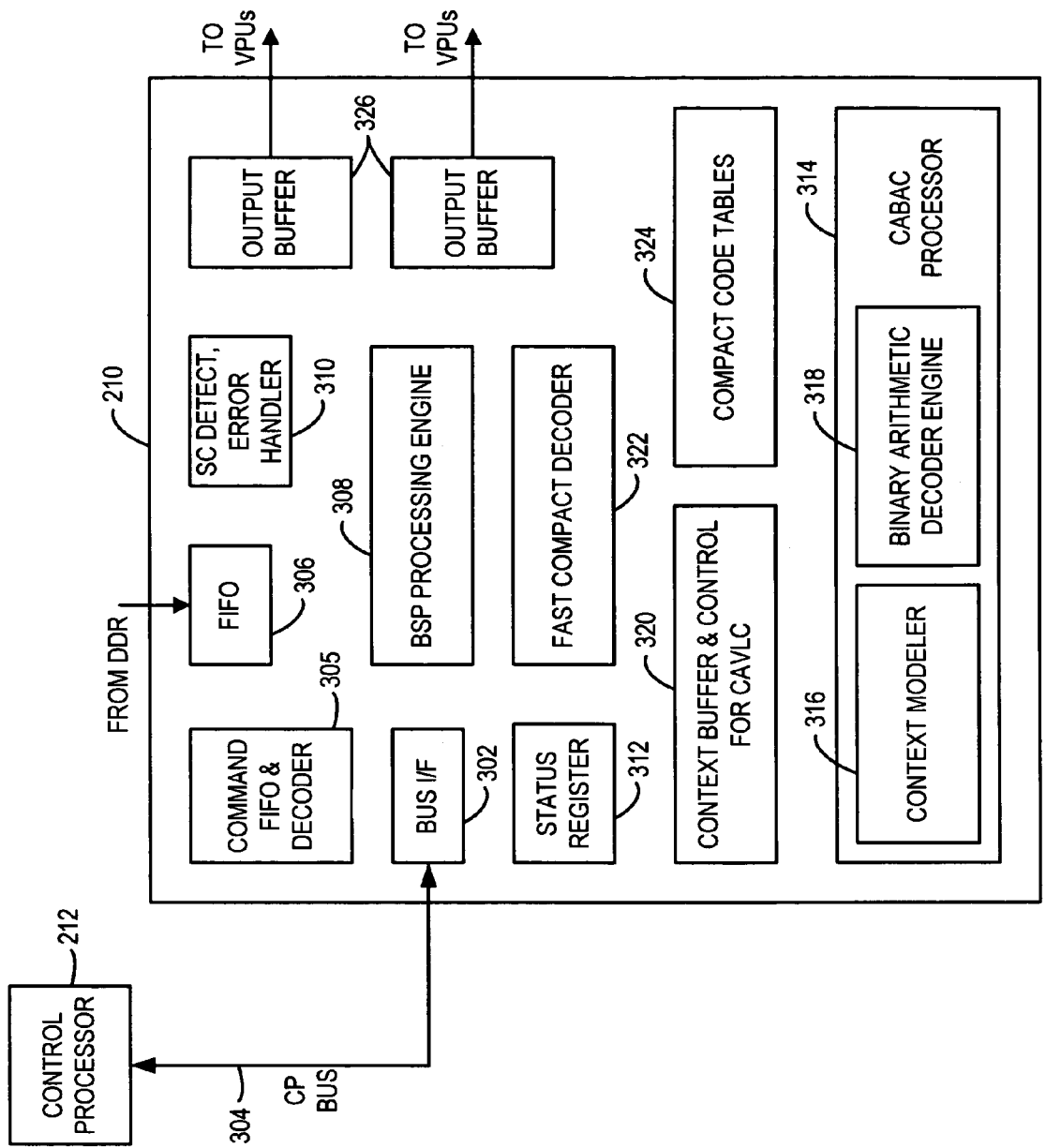
FIG. 3 is a block diagram which shows some details of a bitstream parser block that is part of the video decoder block of FIG. 2.

FIG. 3 is a block diagram which shows some details of the BSP 210.

The BSP 210 includes a bus interface 302 which is connected to a control processor bus 304. The BSP 210 engages in data messaging with the control processor 212 via the bus interface 302 and the control processor bus 304. The control processor 212 provides control functions for the BSP 210 via signals received at the bus interface 302. Commands from the control processor 212 are temporarily stored and are decoded in a command buffer and decoder indicated at 305 as also being part of the BSP 210.

The BSP 210 also includes a first-in-first-out (FIFO) memory 306 which receives the input bitstream from the memory 202 (FIG. 2) via the memory controller 204 (also shown in FIG. 2, not FIG. 3). A processing element 308 that is part of the BSP 210 provides control instructions and "side information" for other components of the BSP 210.

Also included in the BSP 210 is a start code detection and error handling block 310. An additional component of the BSP 210 is a status register 312, which stores status messages to be provided to the control processor 212 via the bus interface 302 and the control processor bus 304.

The BSP 210 further includes a CABAC-decode processing block 314 which is of central relevance to the present disclosure. The CABAC-decode processing block 314 includes a context modeler block 316 and a binary arithmetic decoder engine (BADE) 318, both of which are described in detail below. The context modeler block 316, as will be seen, provides context probability state information to the BADE 318, which uses the context indexing information to perform bit-to-bin expansion on input bits from the FIFO memory 306 based on the context probability state information.

The BSP 210 also includes circuitry (indicated at 320) to implement CAVLC (context-adaptive variable length coding) decoding, so that the BSP 210 can also handle decoding of compression-encoded video data that has been encoded with the CAVLC option of H.264 rather than with the CABAC option.

In addition, the BSP 210 includes a variable length decoder block 322 (referred to as a "fast compact decoder" or "FCD"), which receives a stream of bins from the BADE 318 and matches the bins against code words to translate the bins into a sequence of H.264 syntax elements. Also included in the BSP 210 are code tables 324 used by the FCD 322 to translate the bins into syntax elements. Still further, the BSP 210 includes one or more output buffers 326 for storing the syntax elements prior to the syntax elements being supplied to the video signal processing units 214 (FIG. 2, not shown in FIG. 3).

Figure 4:
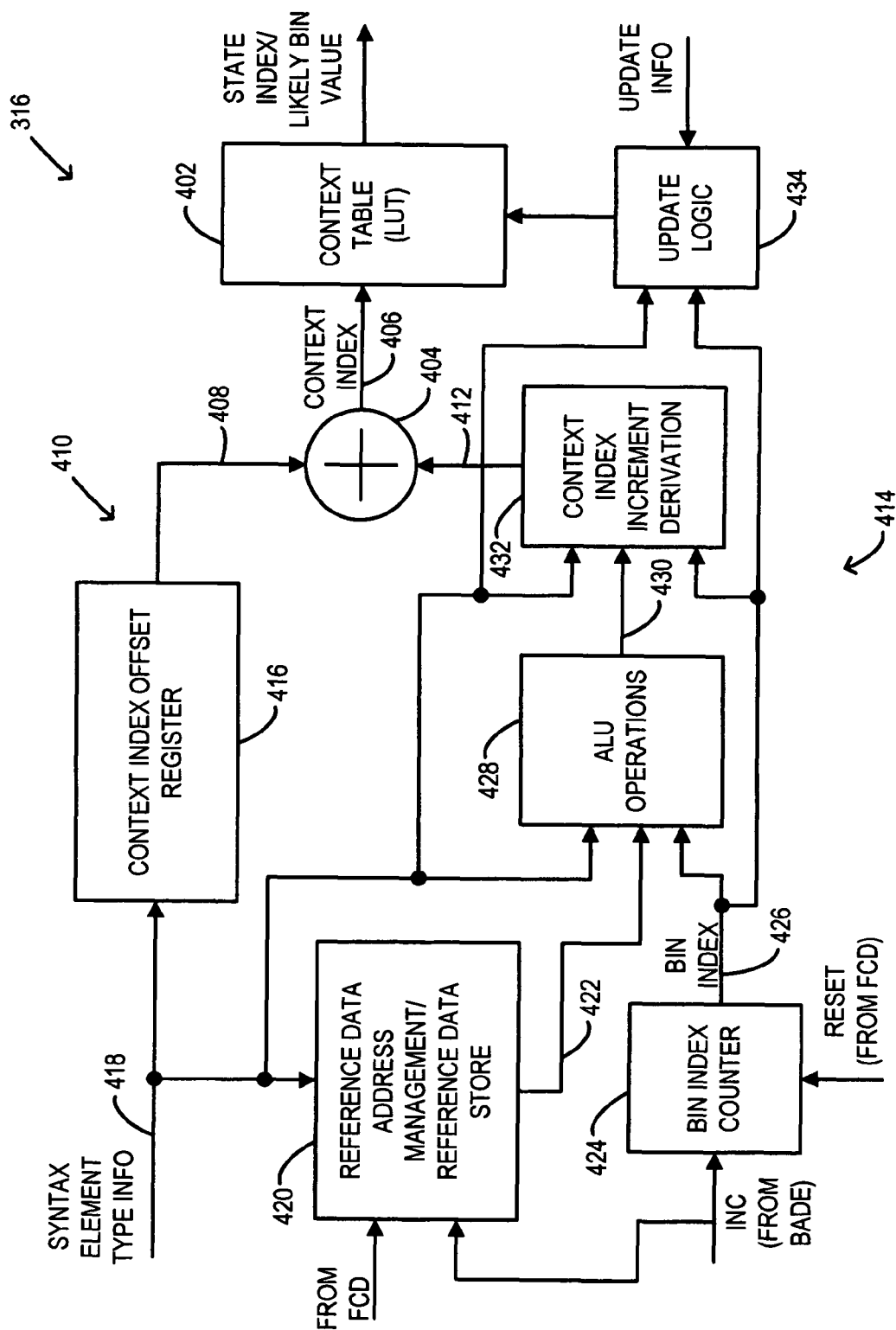
FIG. 4 is a block diagram which shows some details of a context modeler block that is part of the bitstream parser block of FIG. 3.

FIG. 4 is a block diagram which shows some details of the context modeler block 316. In particular, FIG. 4 illustrates an architecture for a hardware implementation (i.e., a hardware accelerator) for the context modeling aspects of CABAC-decoding. The architecture of FIG. 4 allows for determination of the appropriate context model for a current bit/bin in just a few clock cycles, thus promoting a practical and efficient hardware-based approach to CABAC-decoding. The ensuing discussion, and the subsequent discussion of the BADE, both assume that the reader is generally familiar with the concepts of binary arithmetic coding and is also familiar with CABAC-encoding, as described in the H.264 standard.

Each "slice" of the video signal contains a different type of syntax elements. For each syntax element within a slice, there are up to N bins ($b_1$, $b_2$, . . . , $b_N$) based on the type of binarization that was performed. There may be one or more context labels associated with each of the bins. If there is more than one context label associated with a bin, then there are specific rules to select the appropriate context to use.

A "context model" is a probability model for one or more bins of a binarized symbol (syntax element). This model may be chosen from a selection of available models depending on the statistics of recently-decoded syntax elements. The context model stores the probability of each bin being "1" or "0". The context modeler block 316 operates to select the context model to be used by the BADE 318 for decoding the current bin.

In the CABAC-encoding called for by the H.264 standard, there are a total of 460 separate context models for the various syntax elements. Entries for these context models are stored in a look-up table 402 (FIG. 4) that is part of the context modeler block 316. Each entry includes a 6-bit probability state index and the binary (one bit) value of the most probable bin value. These seven bits together define a context index to be provided to the BADE 318.

The context models are initialized at the beginning of each slice and also at the beginning of each frame. The seven bit index entries may be calculated by the control processor 212 (FIGS. 2 and 3) or by the processing element 308 at the start of the slice and stored in a local RAM (not separately shown) to constitute the look-up table 402.

The context modeler block 316 also includes an adder 404 which has its output coupled to the look-up table 402. The adder 404 calculates a context index signal 406 which is supplied to the look-up table 402 to select the context information (state index and most likely bin value) to be output from the look-up table from among the context information stored in the look-up table 402. As adder inputs the adder 404 receives a context index offset signal 408 from a first circuit branch 410 and a context index increment signal 412 from a second circuit branch 414.

(The adder 404 may be considered to be one example of a "combiner". As used herein and in the appended claims, "combiner" refers to an adder or any other circuit that produces a sum from two or more input values.)

In some embodiments, the first circuit branch 410 includes a context index offset register 416. The context index offset register is coupled to receive an input signal 418. The input signal 418 may indicate what type of syntax element (or prefix or suffix portion of syntax element) is currently being decoded. Based on the input signal 418, the context index offset register selects the value of the context index offset signal 408 to be output to the adder 404. Thus effectively the context index offset register may function as a look-up table.

In some embodiments, the first circuit branch 410 may include two offset registers (not separately shown). In such embodiments, one of the registers always outputs an offset value to the adder 404, while the other register outputs to the adder 404 a second offset value only in cases where the current syntax element is of a type that represents a block of transform coefficients. Thus in some embodiments, the adder 404 may, in some circumstances, receive three inputs rather than the two inputs 408 and 410 indicated in FIG. 4.

In any case, the first circuit branch 410 operates to output, based on the type of the current syntax element to be decoded, an offset to be used in calculating the index signal for the look-up table 402.

In some embodiments, the second circuit branch 414 includes a reference data block 420. The reference data block 420 is coupled to receive the input signal 418, mentioned above, which indicates the type of the current syntax element. The reference data block is also coupled to the FCD 322 (FIG. 3, not shown in FIG. 4) and also to the "INC" signal supplied to the bin index counter described below, in some cases to receive from the FCD 322 data which indicates previously decoded syntax elements. These syntax elements are stored in the reference data block 420 as reference data that is used together with other inputs to determine the context index increment signal 412. The previously decoded syntax elements may be from the same slice (image or image segment) as the current syntax element that is being decoded. For example, in some embodiments, the syntax elements data stored in the reference data block may correspond to image regions (blocks and/or macroblocks) that are above and to the left of an image region represented by the current syntax element.

In some embodiments, the input to the reference data block 420 may, in addition to indicating the type of the current syntax element, also indicate the type and/or attributes of the current macroblock.

The reference data block 420 is operative, in response to the input signal 418 and/or to other information, to select and output reference data from among the data received from the FCD 322 and previously stored in the reference data block 420. This output reference data is indicated at 422 in FIG. 4.

The second circuit branch 414 also includes a bin index counter 424. The bin index counter 424 is operative to output a bin index 426 which is the current value of the counter 424.

The counter 424 is coupled to a controller block (not shown) that is part of the context modeler to receive an increment signal in response to the FCD 322 failing to find a matching syntax element with the current bin. The increment signal is also provided to the reference data block 420. The counter 424 is also coupled to the FCD 322 to be selectively reset by the FCD 322 (i.e., to be reset each time the FCD decodes a syntax element).

The second circuit branch 414 may further include an arithmetic logic unit operations block 428. The ALU operations block 428 receives as inputs (a) the input signal 418 which is indicative of the type of the current syntax element, (b) the reference data 422 selected by and output from the reference data block 420, and (c) the bin index 426. The resulting output signal 430 from the ALU operations block 428 is generated in a manner to implement requirements of the H.264 standard for selection of the appropriate context model for decoding the current bin. The output signal 430 is provided to a context index increment derivation block 432, which is also part of the second circuit branch 414. The context index increment derivation block is also coupled to receive the input signal 418 and is coupled to the bin index counter 424 to receive the bin index 426. Based on these inputs, the context index increment derivation block 432 functions to aggregate operations (such as conditional check or if statement, adds, shifts, assignments) performed by the ALU operations block 428 and to produce as a result the above-mentioned context index increment signal 412. Thus the context index increment derivation block 432 is coupled to the adder 404 to output the context index increment signal 412 as an input to the adder 404.

Although the ALU operations block 428 and the context index increment derivation block 432 are shown separately in FIG. 4, these two blocks may be combined to form a block which derives the context index increment signal based on inputs 418, 422 and 426. Moreover, even if the ALU operations block 428 and the context index increment derivation block 432 are physically laid out as separate blocks, the two may be conceptually regarded as a single block which derives the context index increment signal based on the inputs indicated in the previous sentence.

In any case, the second circuit branch 414 operates to output an increment that is added to the output from the first circuit branch 410 to generate the index signal for the look-up table 402.

The context modeler block 316 also includes a context information update block 434. The context information update block 434 is coupled to the look-up table 402 to update the context information stored in the look-up table 402. The information for updating the look-up table is received by the context information update block 434 from the BADE 318, which is described in more detail below.

Figure 5:
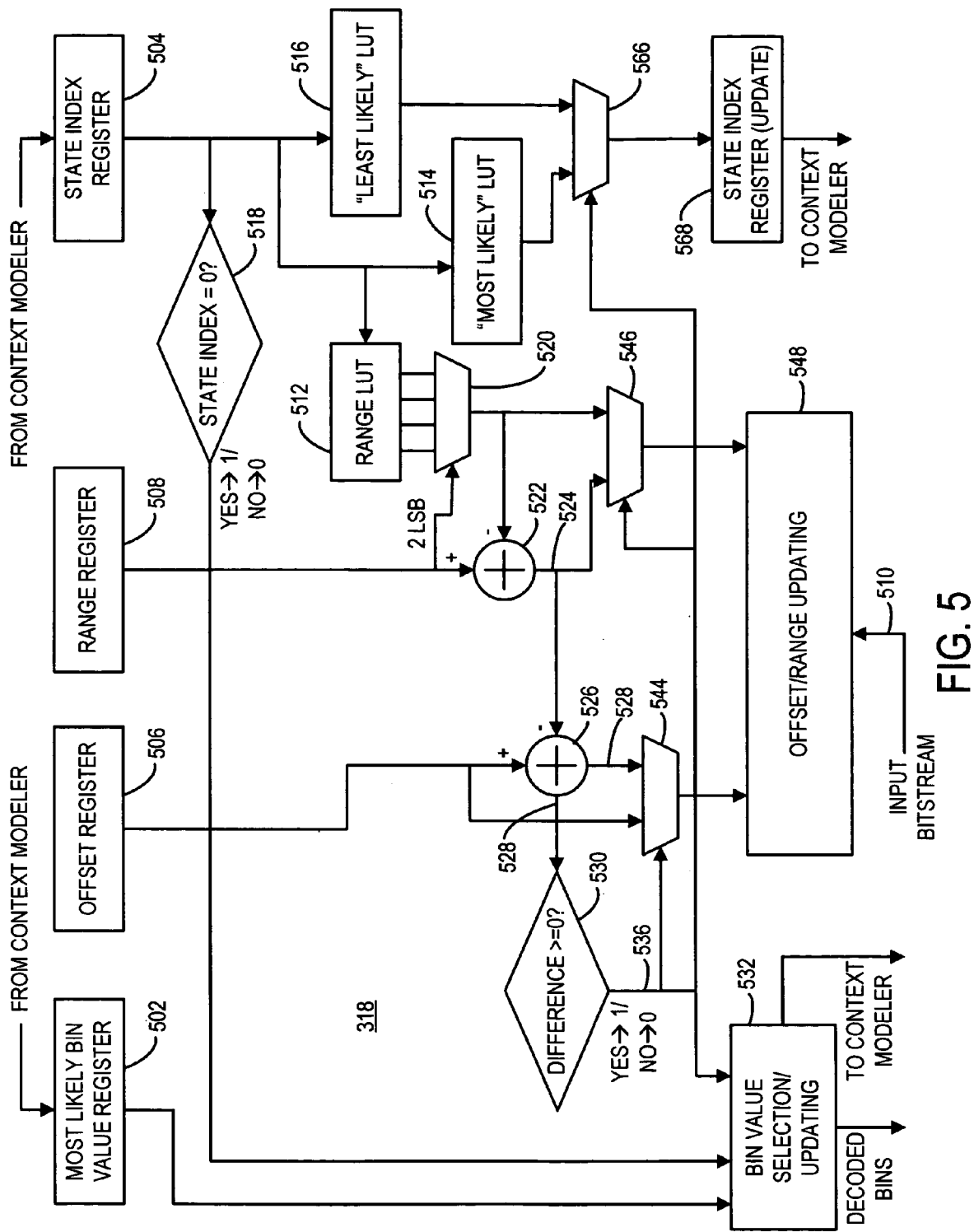
FIG. 5 is a block diagram which shows some details of a binary arithmetic decoder engine (BADE) that is part of the bitstream parser block of FIG. 3.
Figure 6:
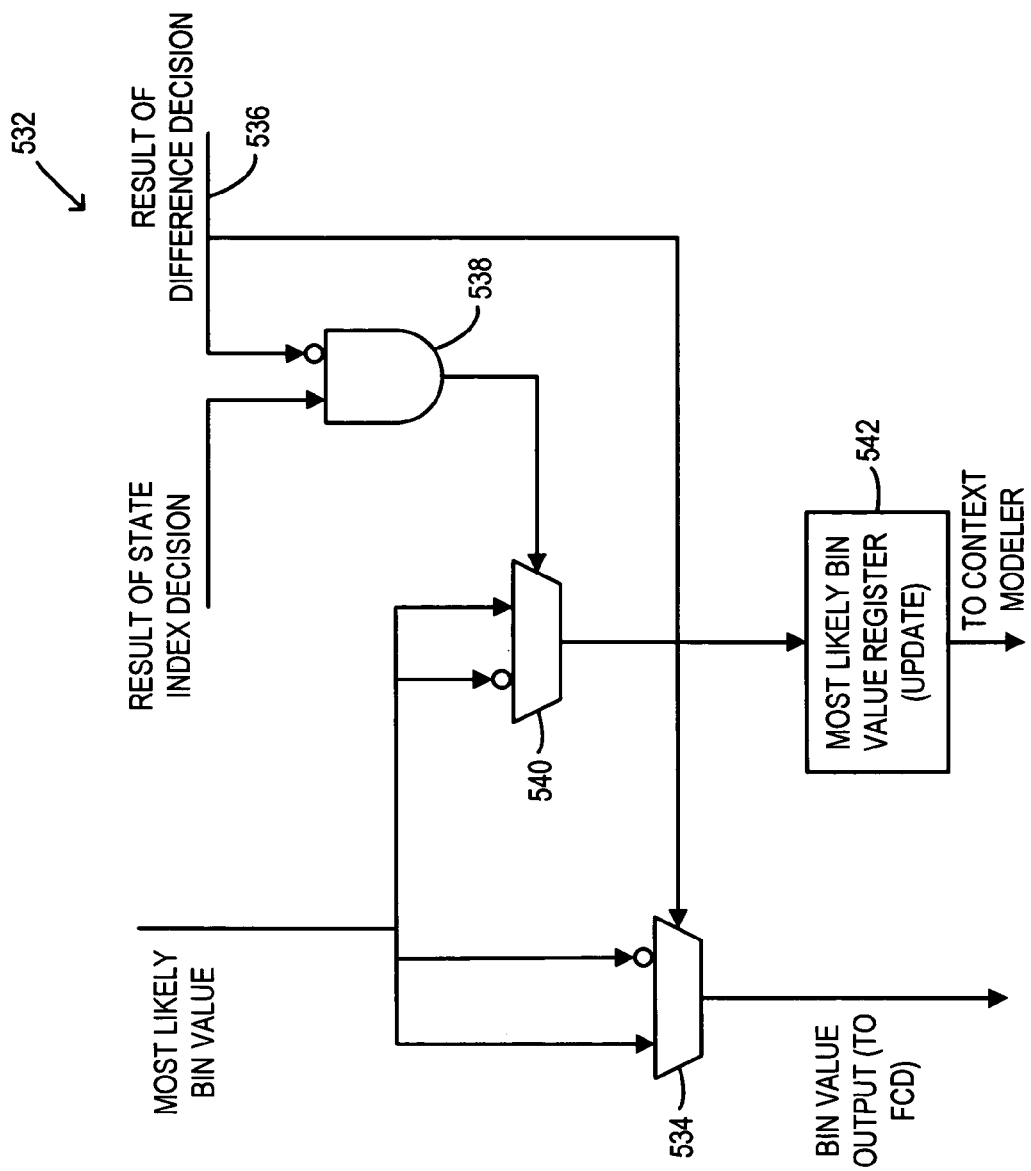
FIGS. 6 and 7 are diagrams which show additional details of the BADE of FIG. 5.
Figure 7:
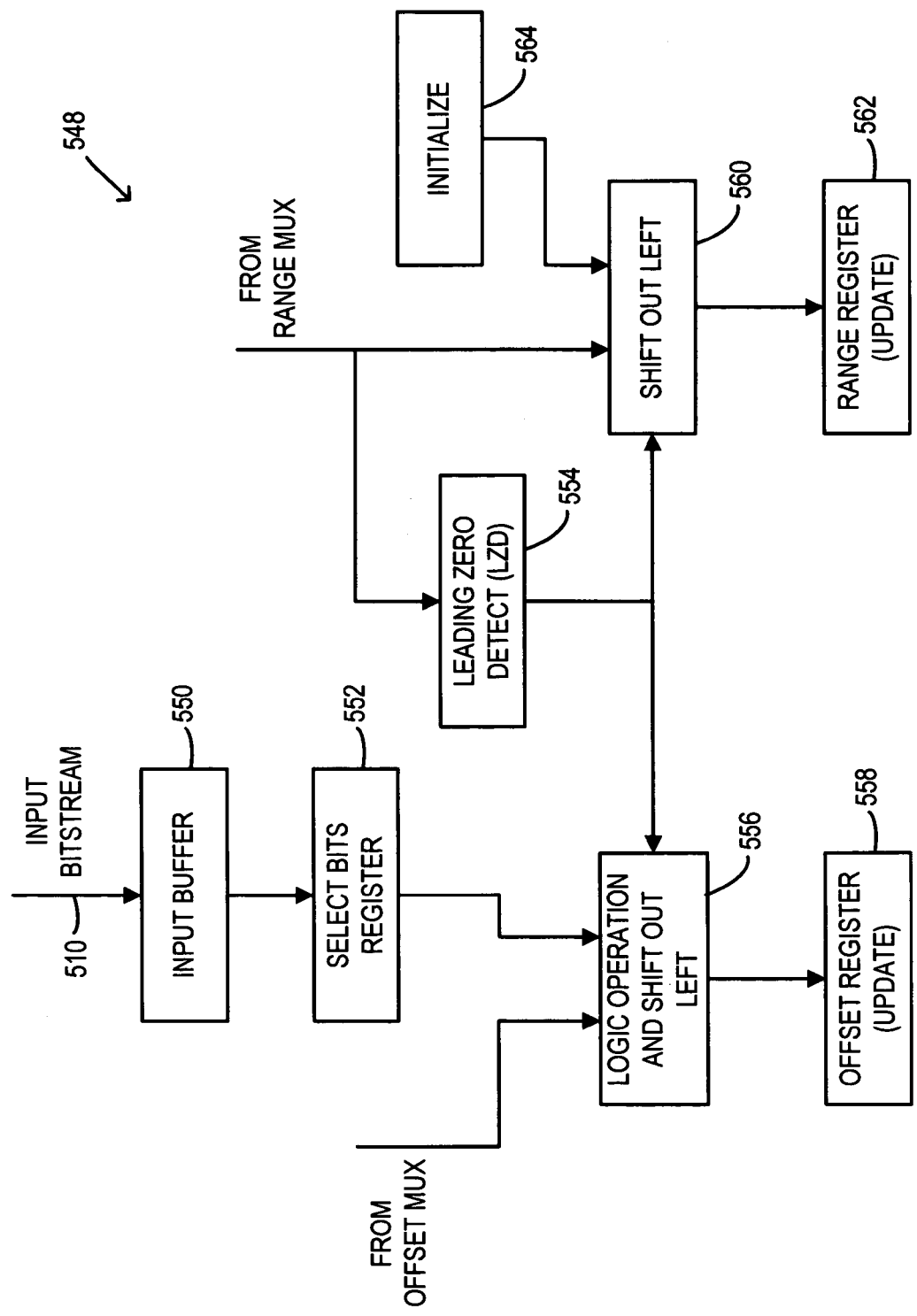

FIG. 5 is a block diagram which shows some details of the BADE 318. FIGS. 6 and 7 are diagrams which show additional details of the BADE 318.

The BADE 318 includes a most likely bin value register 502. The most likely bin value register 502 receives the most likely bin value output from the look-up table 402 (FIG. 4) of the context modeler block 316 and stores the most likely bin value.

The BADE 318 also includes a state index register 504. The state index register 504 receives the current state index value from the look-up table 402 of the context modeler block 316 and stores the state index value.

The BADE 318 further includes an offset register 506 and a range register 508. The offset register 506 stores a current offset value and the range register 508 stores a current range value. As will be seen, the values stored in the offset register 506 and in the range register 508 are updated from a previous cycle of operation of the BADE 318. The offset value is derived from the input bitstream (indicated at 510) in a manner to be described below, and the range value is derived from a value that is output from a range look-up table 512, which is indexed by the state index value stored in the state index register 504.

In addition to the range look-up table 512, the BADE 318 also includes look-up tables 514 and 516. All three of these look-up tables are coupled to the state index register 504 to be indexed by the state index value stored in the state index register 504. The look-up table 514 is to provide a state index update value in case the most likely bin value is selected in the current cycle, and the look-up table 516 is to provide the state index update value in case the least likely bin value is selected in the current cycle. All three of the look-up tables 512, 514, 516 are consistent with look-up tables called for by conventional software-based implementations of H.264/CABAC decoders.

The BADE 318 also includes a decision block 518. The decision block 518 is coupled to the state index register 504 to indicate whether the state index value stored in the state index register 504 is equal to zero. If so, the decision block 518 outputs a "1" value as an output. Otherwise, the decision block 518 outputs a "0" value as an output.

Still further, the BADE 318 includes a four-input multiplexer 520. The multiplexer 520 has its inputs coupled to the range look-up table 512. Each of the inputs of the multiplexer 520 receives a respective one of a group of four outputs from the range look-up table 512. The particular group of four outputs is selected by the current state index value stored in the state index register 504, so that the state index value acts as an index for the range look-up table 512. The particular group of four outputs is selected from among a number of groups of four values stored in the look-up table 512.

The multiplexer 520 is also coupled to the range register 508 so as to be controlled by the two least significant bits of the range value stored in the range register 508. The value of the two least significant bits of the range value selects the particular one of the outputs of the range look-up table which is, in turn, to be passed on as the output of the multiplexer 520.

The BADE 318 also includes a subtraction block 522. The subtraction block 522 is coupled to the range register 508 and to the output of the multiplexer 520. The subtraction block 522 operates to subtract the range look-up table value selected by the multiplexer 520 from the range value stored in the range register 508. The result of this subtraction is a difference value indicated at 524.

Further, the BADE 318 includes a subtraction block 526. The subtraction block 526 is coupled to the offset register 506 and to the output of the subtraction block 522. The subtraction block 526 operates to subtract the difference value output from the subtraction block 522 from the current offset value stored in the offset register 506. The result of the subtraction performed by the subtraction block 526 is a difference value indicated at 528.

The BADE 318 also includes a decision block 530. The decision block 530 is coupled to the output of the subtraction block 526 to indicate whether the difference value 528 is not less than zero. If the difference value 528 is greater than or equal to zero, then the decision block 530 provides an output having the value "1". If the difference value 528 is less than zero, then the decision block 530 provides an output having the value "0".

It is to be understood that the subtraction block 526 and the decision block 530 may be considered to together constitute a compare block that compares the offset value in the offset register 506 with a value derived from the range value in range register 508.

The output of the decision block 530 is provided to a bin value selection and updating block which is indicated at 532 in FIG. 5 and is shown in more detail in FIG. 6. The bin value selection and updating block 532 is part of the BADE 318 and includes a multiplexer 534 (FIG. 6). The multiplexer 534 is coupled to the output (indicated at 536 in FIGS. 5 and 6) of the decision block 530 (FIG. 5) so as to be controlled by the output 536. The multiplexer 534 has two inputs, one of which is an inverting input, and both of which are coupled to the most likely bin value register 502 (FIG. 5). Thus the multiplexer 534 selects between the most likely bin value and the inverse of the most likely bin value in response to the value output from the decision block 430. If the value that is output from the decision block 430 is "1", then the multiplexer 534 selects the most likely bin value to be its output value. If the value that is output from the decision block 430 is "0", then the multiplexer 534 selects the inverse of the most likely bin value to be its output value. The output value from the multiplexer 534 is then output from the BADE 318 to the FCD 322 (FIG. 3) as the current decoded bin value.

Continuing to refer to FIG. 6, the bin value selection and updating block 532 also includes an AND logic gate 538. The AND gate 538 has an inverting input coupled to the output 536 of the decision block 530 (FIG. 5) and a non-inverting input coupled to the output of the decision block 518. The bin value selection and updating block 532 also includes a multiplexer 540. The multiplexer 540 is coupled to the AND gate 538 to be controlled by the output of the AND gate 538. The multiplexer 540 has two inputs, of which one is an inverting input. Both of the inputs of the multiplexer 540 are coupled to the most likely bin value register 502 (FIG. 5). Like the multiplexer 534, the multiplexer 540 selects between the most likely bin value and the inverse of the most likely bin value. The selecting performed by the multiplexer 534 is in response to the output of the AND gate 538. If the AND gate output is "1" (logical true), then the multiplexer 540 selects the inverse of the most likely bin value to be the output value of the multiplexer 540. If the AND gate output is "0" (logical false), then the multiplexer 540 selects the most likely bin value to be its output value. The output value from the multiplexer 540 is then stored in a most likely bin value update register 542. The most likely bin value update register 542 is part of the bin value selection and updating block 532 and is coupled to the output of the multiplexer 540. From the register 524, the update most likely bin value is output from the BADE 318 to the context information update block 434 (FIG. 4) of the context modeler block 316 to update the look-up table 402.

The BADE 318 further includes a multiplexer 544 (FIG. 5) which is coupled to the offset register 506 and to the output of the subtraction block 526. The multiplexer 544 is also coupled to the decision block 530 to be controlled by the output 536 of the decision block 530. Under the control of the output 536, the multiplexer 544 selects between the current offset value stored in the offset register 506 and the difference value 528 that is output from the subtraction block 526. If the output of the decision block 530 is "1", the multiplexer 544 selects the current offset value to be its output value. If the output of the decision block 530 is "0", the multiplexer 544 selects the difference value 528 to be its output value.

The BADE 318 also includes a multiplexer 546. The multiplexer 546 has an input coupled to the subtraction block 522 to receive the difference value 524. The other input of the multiplexer 546 is coupled to the output of the multiplexer 520. The multiplexer 546 is also coupled to the decision block 530 to be controlled by the output 536 of the decision block 530. Under the control of the output 536, the multiplexer 546 selects between the difference value 524 and the range look-up table value selected by the multiplexer 520. If the output of the decision block 530 is "1", the multiplexer 546 selects the difference value 524 to be its output value. If the output of the decision block 530 is "0", the multiplexer 546 selects the range look-up table value output from the multiplexer 520 to be the output value of the multiplexer 546.

It should be understood that the values input to the multiplexer 544 may be considered "offset update values" in that these values are, or may be used to produce, a value that may be the offset value for a comparison of an offset value versus a range value.

It should also be understood that the values input to the multiplexer 546 may be considered "range update values" in that these values are, or may be used to produce, a value that may be the range value for a comparison of an offset value versus a range value.

The respective output values selected by the multiplexers 544 and 546 are both provided as inputs to an offset and range updating block which is indicated at 548 and which is shown in more detail in FIG. 7. In addition to providing updating functions for the range and offset values compared at the components 526 and 530 (subtraction block and decision block), the offset and range updating block 548 also serves as the point of input for the bitstream 510 that is to be decoded (expanded) into bin values by the BADE 318. Referring to FIG. 7, the offset and range updating block 548 includes an input buffer 550 that temporarily stores bits from the input bitstream 510. In addition, the offset and range updating block 548 includes a register 552 to select bits for use in an offset updating operation that will be described below.

The offset and range updating block 548 also includes a leading zero detection (LZD) circuit 554. The LZD circuit 554 is coupled to the output of the multiplexer 546 to detect a leading zero-valued bit in the output value from the multiplexer 546. (It is to be understood that the "leading zero-valued bit" is the most significant zero-valued bit in a binary number or sequence of bits.)

Further, the offset and range updating block 548 includes an input shift and logic operation block 556. The input shift and logic operation block 556 is coupled to the LZD circuit 554 to be controlled by the LZD circuit 554. The input shift and logic operation block 556 is also coupled to the output of the multiplexer 544 (FIG. 5) to receive the value output from the multiplexer 544. Still further, the input shift and logic operation block 556 is coupled to the register 552 which selects bits from the input bitstream. Under the control of the LZD circuit 554, the input shift and logic operation block 556 shifts out a number of bits from the input bitstream, with the number of shifted-out bits corresponding to the position of the leading zero-valued bit in the output of the multiplexer 546, as detected by the LZD circuit. As part of the same operation, the input shift and logic operation block 556 applies a logic OR operation to the shifted-out input bits and to bits in the output from the multiplexer. The resulting output from the input shift and logic operation block 556 is used to update the offset register 506 (FIG. 5) for the next operating cycle as indicated at 558 in FIG. 7.

Also, the offset and range updating block 548 includes a range shift block 560. The range shift block 560 is coupled to the LZD circuit 554 to be controlled by the LZD circuit 554. The range shift block 560 also is coupled to the output of the multiplexer 546 (FIG. 5) to receive the value output from the multiplexer 544. Under the control of the LZD circuit 554, the range shift block 560 shifts out a number of bits from the output of the multiplexer 544, with the number of shifted-out bits being the same as the number of input bits shifted out in the current cycle by the input shift and logic operation block 556. The shift block 560 may also perform a logical OR operation and may be padded with "0" bits from the right. The resulting output from the range shift block 560 is used to update the range register 508 (FIG. 5) for the next operating cycle as indicated at 562 in FIG. 7.

The offset and range updating block 548 additionally may include an initializing block 564. The initializing block 564 is coupled to the range shift block 560 to supply a sequence of "0" bits to the range shift block 560 during initialization of the BADE 318.

The offset and range updating block 548 is operative, under the control of the LZD circuit 554, to perform in one clock cycle a plurality of iterations of the renormalization loop called for by conventional software based H.264/CABAC decoders. The effective number of iterations of renormalization that are performed in one clock cycle is controlled by the output from the LZD circuit 554.

Referring once more to FIG. 5, the BADE 318 also includes a multiplexer 566. The multiplexer 566 is coupled to the look-up tables 514, 516 to receive therefrom the values selected therefrom by the state index value stored in the state index register 504. The multiplexer 566 is coupled to the decision block 530 to be controlled by the output 536 of the decision block 530. Under the control of the output 536, the multiplexer 546 selects between the value from the look-up table 514 and the value from the look-up table 516. If the output of the decision block 530 is "1", the multiplexer 566 selects the value from the look-up table 514 to be the output value of the multiplexer 566. If the output of the decision block 530 is "0", the multiplexer selects the value from the look-up table 516 to be the output value of the multiplexer 566.

The output value from the multiplexer 566 is then stored in a state index update register 568. The state index update register is part of the BADE 318 and is coupled to the output of the multiplexer 566. From the register 568, the state index update value is output from the BADE 318 to the context information update block 434 (FIG. 4) of the context modeler block 316 to update the look-up table 402.

The architecture of the BADE 318 as described herein is optimized to output decoded bins in a small number of clock cycles. The efficient operation of the BADE is promoted by the operation of the offset and range updating block 548 to perform several stages of renormalization in a single cycle, and also by the parallel control of several multiplexers by the single decision block 530.

Although not shown in the drawings, the context modeler and the BADE may contain circuitry to respond to a "bypass flag". The bypass flag may appear in the input bitstream to indicate that a very low probability syntax element is being transmitted without arithmetic coding. The bypass flag triggers a bypass mode in the BSP so that, for example, the look up tables 512, 514, 516 are not accessed and blocks 502 and 504 are idle.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method of decoding a stream of compression-encoded image data, the method comprising:
   supplying at least two values to an adder, at least one of said values being determined based at least in part on a type of a current syntax element in the stream of compression-encoded image data;
   adding the at least two values at the adder to produce an index value;
   using the index value to access a look-up table;
   obtaining an output value from said look-up table, said output value resulting from said access; and
   providing said output value as an input to a binary arithmetic decoding engine (BADE);
   wherein one of said at least two values is determined based at least in part on a bin index that indicates a number of bins that have been decoded for said current syntax element;
   wherein said bin index is output from a counter, said counter selectively reset by a variable length decoder.

2. The method of claim 1, further comprising:
   updating said look-up table with an update value received from said BADE.

3. A system to decode a stream of compression encoded image data, the apparatus comprising:
   a combiner;
   a first input circuit to supply a first input value to said combiner, said first input circuit determining said first input value based at least in part on a type of a current syntax element in the stream of compression-encoded image data
   a second input circuit to supply a second input value to said combiner;
   a look-up table coupled to receive an output value from said combiner as an index to said look-up table; and
   a binary arithmetic decoding engine (BADE) coupled to receive, from said look-up table, information indexed by said output value from said combiner;
   wherein said second input circuit determines said second input value based at least in part on the type of the current syntax element;
   wherein said second input circuit determines said second input value based in part on at least one previously decoded syntax element;
   wherein said second input circuit includes a bin index counter coupled to said BADE to be selectively incremented in response to said BADE and coupled to a variable length decoder to be selectively reset by said variable length decoder, and said bin index counter outputs a bin index that indicates a number of bins that have been decoded for said current syntax element.

4. The system of claim 3, wherein said combiner, said first input circuit, said second input circuit and said look-up table are part of a decoder;
   said system further comprising a source of video data coupled to said decoder.

5. An apparatus to perform binary arithmetic decoding, the apparatus comprising:
   a first multiplexer to select between two bin output values;
   a second multiplexer to select between two offset update values;
   a third multiplexer to select between two range update values;
   a fourth multiplexer to select between two update values to update a look-up table in a context modeler block; and a compare block to compare a range value and an offset value, the compare block having an output coupled in parallel to control each of said first, second, third and fourth multiplexers.

6. The apparatus of claim 5, wherein a first one of said two offset update values is obtained by subtracting a third value from the other one of said two offset update values.

7. The apparatus of claim 6, wherein said other one of said two offset update values is an input to said compare block.

8. The apparatus of claim 5, wherein said third multiplexer selects between an output of a subtraction block and an output of a fifth multiplexer.

9. The apparatus of claim 8, wherein said output of said adder is an input to said compare block.

10. The apparatus of claim 5, further comprising:
a leading zero detector to detect a leading zero-valued bit in an output of said third multiplexer.

11. The apparatus of claim 10, further comprising a shift and logic operation block coupled to said leading zero detector;
said shift and logic operation block to perform a logical operation and a shift operation with respect to a number of bits in an input bitstream, said number of bits determined by an output of said leading zero detector.

12. An apparatus to perform binary arithmetic decoding, the apparatus comprising:
a leading zero detector to receive a range update value and to detect a leading zero-valued bit in said range update value;
an offset register to store a current offset value;
a first subtraction block coupled to the offset register and to an output of a second subtraction block, the first subtraction block to provide a first difference value obtained by subtracting a second difference value output from the second subtraction block from the current offset value stored in the offset register;
an offset multiplexer coupled to the offset register and the first subtraction block to select between the current offset value and the first difference value; and
a shift and logic operation block coupled to and controlled by said leading zero detector, the shift and logic operation block coupled to receive a value output from the offset multiplexer and to receive selected bits from an input bitstream;
said shift and logic operation block to shift out a number of bits in an input bitstream, said number of bits determined by an output of said leading zero detector, said shift and logic operation block applying a logic OR operation to the shifted-out bits from the input bitstream and to bits from the value output from the offset multiplexer.

13. The apparatus of claim 12, further comprising:
a range value shift block coupled to said leading zero detector;
said range value shift block to shift out said number of bits in said range update value.

14. The apparatus of claim 13, further comprising:
a multiplexer having its output coupled to an input of said leading zero detector.

15. The apparatus of claim 12, wherein said multiplexer is a first multiplexer, and further comprising:
a second multiplexer having its output coupled to an input of said first multiplexer.

16. A context modeler block for a CABAC (context-based adaptive binary arithmetic coding) decoder, the context modeler block comprising:
a context index offset register to output a context index offset signal, said context index offset register coupled to receive an input signal that indicates a type of a current syntax element that is being decoded;
an adder coupled to the context index offset register to receive the context index offset signal as an adder input;
a reference data block coupled to receive said input signal received by said context index offset register, said reference data block to store and output reference data that is at least indicative of at least one previously decoded syntax element;
a bin index counter to output a bin index, said bin index counter coupled to be selectively reset by a variable length decoder;
a context index increment derivation block coupled to said adder to output a context index increment signal as an input to said adder, said context index increment derivation block coupled to receive said input signal received by said context index offset register, said context index increment derivation block also coupled to said reference data block to receive at least some of said reference data from said reference data block, said context index increment derivation block also coupled to said bin index counter to receive said bin index;
said adder operative to add said context index offset signal and said context index increment signal to produce a context index signal;
said context modeler block further comprising:
a look-up table coupled to said adder to receive said context index signal to select output context information from among context information stored in said look-up table; and
a context information update block coupled to said look-up table to update said context information stored in said look-up table, said context information update block coupled to receive said input signal received by said context index offset register.

17. The context modeler block of claim 16, wherein said output context information is provided by said context modeler block to a binary arithmetic decoding engine (BADE).

18. The context modeler block of claim 17, wherein said context information update block is coupled to receive context update information from said BADE.

* * * * *

UNITED STATES PATENT AND TRADEMARK OFFICE
CERTIFICATE OF CORRECTION

PATENT NO.         : 7,804,903 B2                                                      Page 1 of 1
APPLICATION NO. : 11/168617
DATED              : September 28, 2010
INVENTOR(S)        : Munsi A. Haque and Musa Jahanghir It is certified that error appears in the above-identified patent and that said Letters Patent is hereby corrected as shown below:

Please insert closing bracket in Claim 1, Column 10, end of line 14, as follows:

1. A method of decoding a stream of compression-encoded image data, the method comprising:
supplying at least two values to an adder, at least one of said values being determined based at least in part on a type of a current syntax element in the stream of compression-encoded image data;
adding the at least two values at the adder to produce an index value;
using the index value to access a look-up table;
obtaining an output value from said look-up table, said output value resulting from said access; and
providing said output value as an input to a binary arithmetic decoding engine (BADE)_;
wherein one of said at least two values is determined based at least in part on a bin index that indicates a number of bins that have been decoded for said current syntax element;
wherein said bin index is output from a counter, said counter selectively reset by a variable length decoder.

Signed and Sealed this

Twenty-third Day of November, 2010

David J. Kappos
*Director of the United States Patent and Trademark Office*